March 20, 1928.
P. E. CHAPMAN
1,662,881
ARMATURE WINDING MACHINE
Filed March 22, 1924   2 Sheets-Sheet 1
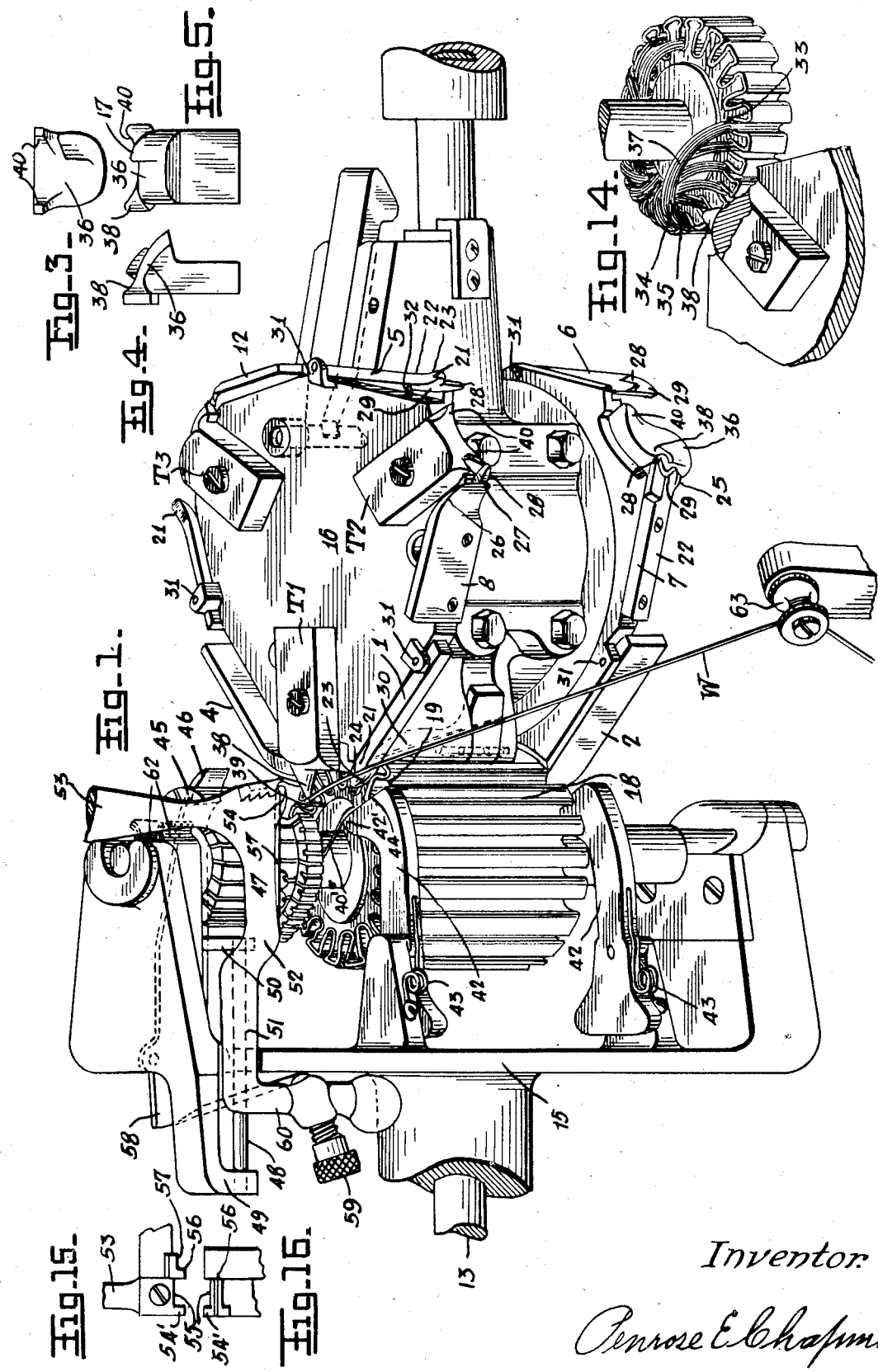
Inventor.
Penrose E Chapman March 20, 1928.
P. E. CHAPMAN
1,662,881
ARMATURE WINDING MACHINE
Filed March 22, 1924  2 Sheets-Sheet 2
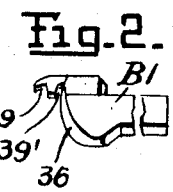
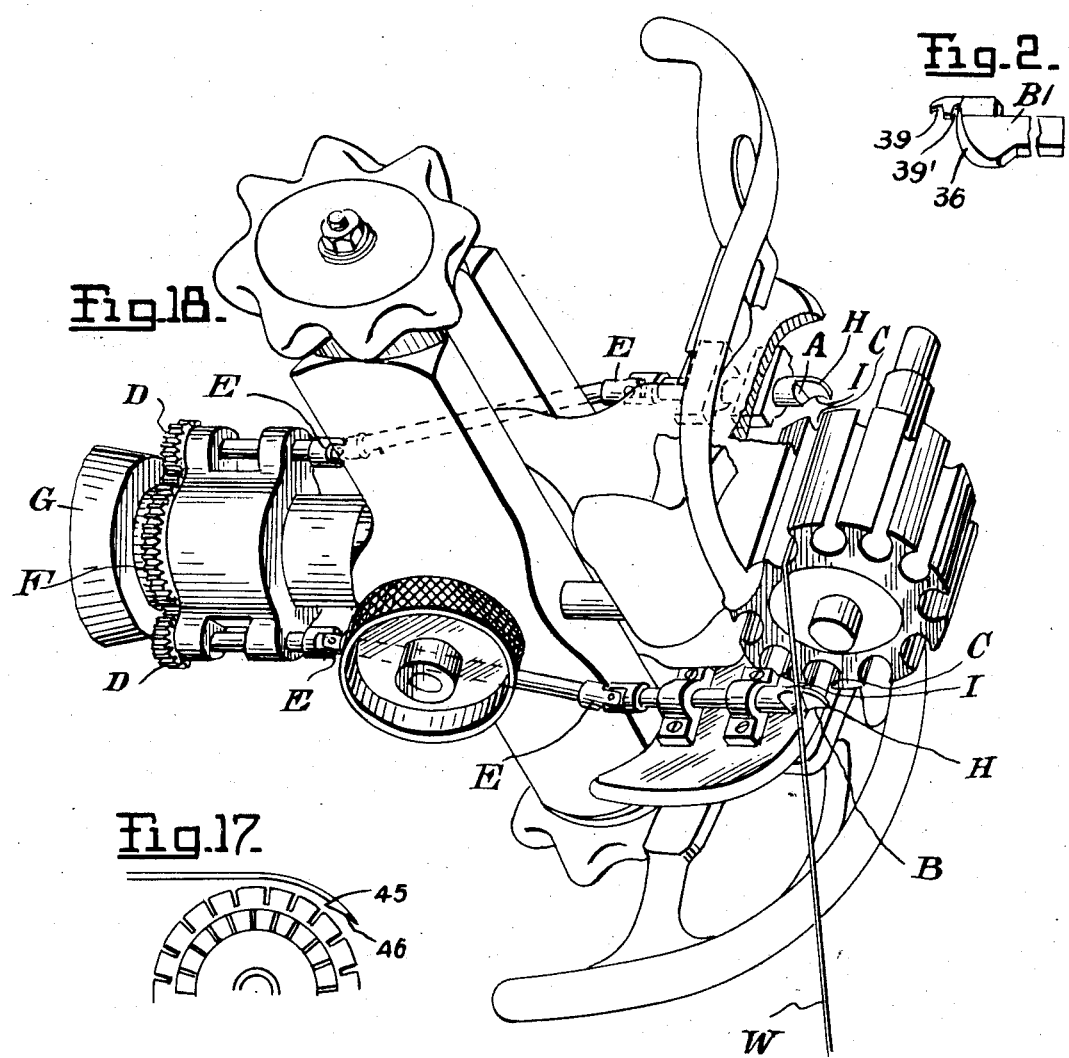
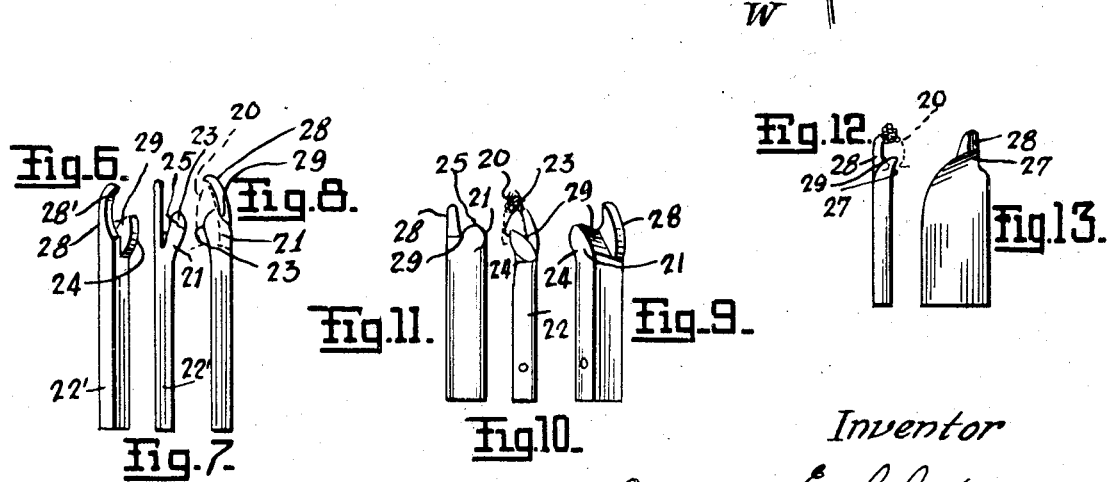
Inventor
Penrose E Chapman Patented Mar. 20, 1928.

1,662,881

UNITED STATES PATENT OFFICE.

PENROSE E. CHAPMAN, OF ST. LOUIS, MISSOURI.

ARMATURE-WINDING MACHINE.

Application filed March 22, 1924. Serial No. 701,082.

The object of my invention is a reduction in the time required to wind armatures of all numbers of poles including both externally and internally (stator) wound armatures. The word armature will herein be used to include all these kinds.

My object is further to enable the winding of the wire directly on multipolar armatures both external and internal instead of the ordinary methods of winding coils and then assembling them in the slots.

Further objects are: the production of layer windings; the elimination of tooth interference; the handling of coarse wire, the provision of means for manipulating the leads as well as protecting the insulation; an improvement in indexing devices and in armature holding chucks. Applications to bipolar and four pole externally wound armatures only are shown, being deemed sufficient for disclosure.

This invention may be considered as allied to and the outgrowth of a number of my previous inventions which will be mentioned at appropriate places. The special terminology developed therein will be adhered to.

In the drawings Figure 1 is a perspective of this invention applied to a four pole armature which requires mounting in a lathe having head and tail stock (similarly to that disclosed in my Patent #874,163 on multipolar armature winding machines). The shafts 13 and 14 being portions of said lathe, the armature is supported on a conventional chuck 15 which in addition may carry the lead handling devices.

Three sets of wire directing guides being carried on the turret 16, for in this machine I prefer to use distinct sets for different coils rather than combined as in the said patent.

Figure 2 is a view of the winding knuckle $B^1$ which is on the concealed side of the winding head opposite $T^1$.

Figures 3, 4 and 5 are front and side elevation and plan of the knuckle $B^3$ also on the concealed side of the winding machine opposite to $T^3$ showing the offsetter 17 applied thereto.

Figures 6, 7 and 8 are ⅛ view, plan, and elevation, of the winding guide or finger #1 (see Figure 1).

Figures 9, 10 and 11 are similar views of winding finger #9.

Figures 12 and 13 are elevation and plan of winding finger #12.

Figure 14 is a detail showing the use of the fractional coil form or knuckle finger in forming the overhanging part of the coil end.

Figures 15 and 16 are respectively right elevation and inverted plan of the lead setter and skinner bits.

Figure 17 is a partial plan clarifying the shape and position of my lead snubbing hook.

Figure 18 is a view of a worm type offsetter as applied to a bipolar machine.

One of the problems involved in winding multipolar armatures is that any wire wound into the slots has a tendency to wind against the teeth which the coil encloses, but in order to fill the slots with more than one tier of wire i. e., more than one turn per layer it is necessary that the wire be "offset" that is, after it is introduced into the slot opening it be forced up and away from the teeth around which it is being wound, and into place, in other words forced upwards against the tension on the winding wire. Those wires laying at right angles to the depths of the slots will be considered as in layers, while those wires which lay approximately parallel with the depths of the slots as in tiers.

In my patent on offsetters #1,351,230 (hereinafter referred to as the "offsetter patent"), I have shown means for offsetting. It was shown applied only to the trailing corners of the slots. In this application I disclose means for use in conjunction with these offsetters at the entering corners, thereby obtaining the rather surprising (as no turn by turn feeds are used) layer forming characteristics on these corners as well as the trailing corners. At the same time I overcome another difficulty in winding armatures particularly evident on multipolar armatures both external and internal, which is the interference of the teeth 18 (next external to the coil) with the wire going into the slots. It is necessary in order that the wire go in the slots without injury by these teeth and to aid the entering offsetter that the wire at the entering corner 19 of the slot be held out thereof until the slot filling wire W assumes a position that will enable its being put into the slot without injury from the said teeth.

It is of course desirable that wire kinking guards and time killing devices be done away with. I am able to accomplish these objects by either of the following methods. First I will describe the method illustrated in Figure 1.

Figures 6 to 11 are various views of winding guides or fingers for the entering end of slots of different proportions for winding coils at different locations in the armature. Figures 6 to 8 are the No. 1 entering finger at 45° angle, plan and elevation. A slot 20 is dotted behind Figure 8 which gives its location physically with reference thereto and shows that it is intended for winding in the bottom of the slot.

Figure 9 is an angle view of the entering finger 9. Figure 10 is an elevation showing the relation of the said finger to the slot 20, and revealing that it is intended to wind in the top of the slots. Figure 11 being a plan view of the same finger. On each one of the wire directing guides or "winding fingers" as I shall hereinafter call them at the entering corners, numbers 1, 5, 7 and 9 shown in the drawings and 3 and 11 which are on the opposite side of the machine, I provide a holding surface 21 on which the winding wire W is shown impinged in Figure 1 this surface is placed at such an angle that it holds the winding wire out of the slot until the winding machine has turned to a position permitting its passage into the slot without injury by the teeth. At this position the wire directing or as I shall call it, driving surface, 22, comes into play, overcomes the effect of the holding surface, 21, forcing the wire W over the offsetter 23 and into the slot.

The action of holding, driving and offsetting are so intermingled that instead of distinctly occurring on the holding, driving and offsetting surfaces they seem to occur more on the transition surface 24 which connects the said surfaces.

At the final delivery of the turn from the winding finger additional delivering action is sometimes required, this I supply by the delivery surface, (angle or curve) 25 which has an influence quite disproportionate to its size.

Figures 12 and 13 are elevation and plan of a trailing finger 12 the delivery surface 26 on which becomes a curve quite extensive as compared with the delivering surface 25 on the entering finger. It has an offsetter 27 whose action is practically the same as that described in my offsetter patent and need not be described further than to say that associated with it is an insulation protection finger 28 and coil forming foot 29. The trailing fingers are numbered 2, 4, 6, 8, 10 (not shown) and 12.

The second method is illustrated in Figure 18 which shows it in connection with my adjustable bipolar drum armature winding machine head, which has been the subject of other patents and applications. It is of possibly more value on bipolar than on multipolar armature winding machines.

To this head I apply what I call a "worm" offsetter A (B being a duplicate thereof) which is placed in the path of the winding wire W as shown at the entering corner of the slot C this worm is driven preferably by means of a gear D on its shaft which latter may be fitted with gimbal joints E, this gear D meshes with the stationary gear F that is attached to the stationary means for supporting the winding head, as the motor frame G. A very good ratio between these gears is two to one.

The action of this device is as follows: When the winding machine revolves the wire W impinges on the worm A and is held out of the entering end C of the slot until the wire assumes substantial parallelism with the said slot, at which time the rotation of the worm carries the said wire outwardly against the winding tension until it is delivered, or delivered to the offsetting surface H of the worm over which it will slip to the far side of the slot in a substantially similar manner to the rigid offsetter on the other end of the slot, as described in said offsetter patent.

Where conditions are favorable I may dispense with the lead of the worm, making it in the form of a groove or I may even dispense with the groove also, allowing the winding wire to impinge on what would then be a smooth surface, the motion of which would then bring the offsetter surface H into play and discharge the wire over it, or I may dispense with the offsetting surface and use the worm only.

When properly proportioned both methods and especially when combined with offsetters at the other end of the slot will produce "level" windings or windings that are even beyond level and put the wire in layers changing the number of turns in the layer as the width of the slot changes.

In multipolar armature winding whether external or internal, the strain or pull of the winding wire comes very largely against the corners of the armature teeth, whereas in bipolar armatures the winding strain comes to a far greater extent directly on the bottom of the slots. This strain has a tendency to distort the teeth of the armature core particularly the rather soft fibre punchings that are usually placed on the end thereof, and what is still worse to cut through the slot insulation and ground the windings as is much more apparent on coarser wires than on fine. To overcome this difficulty I provide, insulation protecting fingers 28 shown attached to the winding fingers 1 to 12 which assume different lengths, different proportions and even different shapes, to take most of the strain of the wire off the corners of the slots. One of the variations in form referred to will be noticed at 28' Figures 6 and 8 where the tip end of the finger 28 is shown with a slight hook this particular type of finger finds its greatest usefulness on coils which go in the bottom of the slots the hook then taking the winding strain off the bottom edges thereof.

The term "corner of the slot" will be taken to include both the side and the bottom corners. Where the wire is wound in the top of the slots the fingers may of course be comparatively shorter as in Figures 9, 10, 11 and the hook would then be undesirable.

These insulation protecting fingers when of proper proportions are so effective that armatures may actually be wound without fibre end punchings and still not have an undue proportion of grounds or break downs later on.

These insulation protecting fingers are quite different from the short fingers or beards which I have provided in practically all my winding machines for carrying the wire past the overhanging corner of the slot.

The presence of these insulation protecting fingers particularly when combined with my armature indexing dog 30 present an additional problem, for they will interfere with the previous coil when positioning the winding machine for winding the next coil. To overcome this difficulty I prefer to mount some or all the winding fingers on hinge pins 31 with a spring 32 for holding them in a clearance position (Figure 1 at 5) and allowing them to automatically assume the winding position (Figure 1 at 1) when the winding wire W is encountered.

The surface 29 carried by the forming fingers or more accurately by the offsetters, I shall call a "forming foot" for when formed correctly it plays a very marked part in the formation of the top of the coil the last layer thereof being wound between it and the preceding layer thus providing a positive means for the smooth winding thereof in addition to the layer forming characteristics of other parts.

A problem not encountered in winding bipolar armatures that is encountered in winding multipolar armatures is the formation of the ends of the coils i. e., the head of the armatures winding. For fine wire the parts S shown in my Patent 874,163 accomplished this object very neatly, the wire being slipped over the angular surface thereof until it came to rest upon the land at the bottom end.

For coarse wire armatures such as this application is more particularly concerned with I have discovered a far better method of accomplishing the same end.

I shall call the coil end forming parts T¹, T², T³ and B¹, B², B³, Figures 1, 2, 3, 4 and 5 "knuckles" as this term has come into universal use in connection with parts of coil forming apparatus which have to do with the ends of the coils.

In nearly all forms of multipolar armature winding either external or internal the succeeding coils nest with each other, the lower or leading half of the coil end 33 lying over the same part of the preceding coil, the upper half of the coil end 34 lying inside of the same part of the preceding coil, as it were, overhanging 35. In order to economize space the lower half of the armature coil 33 should be wound directly on the same part of the preceding coil. To accomplish this I prefer to provide a coil forming cheek 36 which for convenience of adjustment I prefer to affix to a knuckle. This cheek when of the proper shape will form the part of the coil end 33 laying over the preceding coil as well as the extreme tip end thereof 37.

This arrangement supports one half of the coil end during winding. The other half on the inside nesting or overhanging part of the coil end 35 is best supported by a fractional end form 38 which in the case of the particular armature illustrated works best when it assumes a form similar to the said overhanging part of the coil end as shown at 35, Figure 14.

This fractional end form will hereinafter be referred to as a "knuckle finger." Considering the smallness of this finger its effect in forming the end of the coils is great.

For forming the first coil and other special positions I have found it desirable to provide a land 39 on the tip end of the knuckle finger 38 to prevent the first turns of the first coil (which has no coil back of it for support) from dropping off of this finger and winding directly against the armature head, the proportions of this land 39 vary quite considerably according to the severity of the duty imposed thereon. In Figure 2 showing knuckle B¹ this land assumes the shape of a considerable hook shown on B¹ and actually requires a secondary land 39' behind it for retaining other turns.

Owing to the different position of the opposing knuckle T¹ which reduces the side pull of the winding wire I am able to reduce the land thereon to only a suggestion of a hook.

Under some conditions I find it desirable to offset the winding wire W not only in the slots but also on the coil ends for by this means the lay of the turns on the ends may be made more continuous and symmetrical with the wire in the slots. In the particular machine used for illustration this is done on the last coil by the offsetting lug 17 applied to knuckle B³ which because it is on the far side of the machine opposite T³ is separately illustrated in Figures 3, 4, 5. My offsetter patent above, mentions the use of offsetters for coil forming, some of the combinations with them herein are however new.

As the wound coils always have a tendency to loosen up when released, interfering with succeeding coils I have found it convenient to provide presser foot 40 to hold them in place while the succeeding coils are wound, as a matter of convenience only I have applied them to all knuckles although they may be separate.

My machinery for winding the wire into the slots of the armature have reduced the time of winding to such an extent that lead handling may readily take far more time than winding the armature. In this invention I overcome some of this lost time as follows:

It is desirable to connect the lower leads of a multipolar armature as it is wound, and as the leads 40' of the most prevalent type of multipolar armature connections point away from the coil they are of necessity out from under the influence of any device which places the wire of the coil in the slots and therefore do not automatically fall into the slot and in addition make a rather sharp bend over the corner of the slot with resultant liability of grounding. Also owing to the elasticity of the winding wire, the property copper has of giving under a continued strain, and the reaction of succeeding coils, by the time the last coils are ready to be placed on over the first, the first coils are very likely to have spread out and to occupy a greater portion of the slots than necessary.

I overcome these three difficulties by the use of the parts 42 which I shall call a "lead layer", which is at once, a lead layer, for guiding the lead into the slot and laying it at a proper point, a lead holder, holding the lead in such a position that the corner of the slot is largely relieved of the tension of the winding wire obviating grounds at this point, and a coil press. I press the first coils back into place by means of the "presser foot" 42' on the lead layer 42 and the spring 43.

The necessity for this presser foot is due to the fact that these first coils do not come under the influence of the presser feet on the knuckles.

In operation: the lead wire after it is secured to the commutator or otherwise will be automatically guided into place by the lead layer surface 44 requiring no attention from the operator, and will be held in place by the bottom end thereof.

After the coil has been wound it is desirable that the upper leads be held straight out and usually not best to connect them as the winding proceeds. To accomplish this I may provide a "snubbing pin" or more accurately snubbing hook 45 which I prefer to make in the form of an inverted hook having a long point suitable for use as a guide for directing the lead wire into the hook when the winding machine is reversed. By making this device as shown the top lead will be automatically discharged as the armature is indexed. After hooking up the lead the winding machine would then be revolved forward to approximately the position shown in Figure 1, when the wire may be engaged by the combination lead skinner and setter 47, one downward motion of which will pull the lower lead wire into place skin it and set it into the commutator slot, this device I prefer to make as follows:

On the shaft 48 held by the brackets 49 and 50 I mount the quill 51 the right hand end of which is formed into the arm 52 carrying the handle 53 and the skinning knife of hook 54 the lead driver or setter 55 and the line up hook 56 which may be suspended on the spring 57 when the slots in the commutator ear are cut to the working surface of the commutator.

The edge of the combined hook or fork and skinning knife, 54 may be sharp and it may even be provided with file surfaces on its interior 54' to aid in skinning the wire, the working surfaces of the line up hook 56 should however, be smooth.

I prefer to spot the "lead handler" as I shall call this device by the aid of a cam as 58 (which may be of any desirable shape from a screw thread up) acting through the follower 59 in this case shown as an adjusting screw (for adjusting the spotting point) arm 60 quill 51 etc.

My lead setter and skinner may be used as a hand tool if made without the supporting members.

By proportioning this device properly the wire will be caused to slide through the hooks an amount sufficient to skin it at that part which should be inserted in the commutator ear.

I prefer to index the armature at this point; when the operations would be repeated.

The indexing of the armature is done in a similar manner to that disclosed in my application #453,363 using a dog 30 acting against the teeth of the core except that I have combined the indexing dog 30 (dotted) with the winding head so that the motion of the tail ram 14 that releases and resets winding heads also operates the indexing dog. I translate the linear motion of the ram into the transverse motion required to index the armature by placing the indexing dog 30 in such a position that the difference in the sine of the angle of the dog open and closed equals the number of teeth it is desired to index. The locking key (not shown) requires no articulation in this combination.

Owing to the low friction of the armature bearings in the chuck 15 it is necessary to provide brakes to prevent the drag of the indexing dog turning the armature backwards on its recession. I do both this and provide a latch for securing the armature in the chuck or holder 15 by means of the latch springs 62 which I prefer to line with some friction material as leather, and to form with a decided retaining hump as shown, and to cause to press against any convenient portion of the armature as the shaft or commutator.

In operation the multipolar type of this device the winding wire W is looped under and around the forming roller 63 which plays an extremely important part. The first coil end, or lead is secured by any suitable means as to a commutator section as shown in Figure 1. The winding position of the turret $T^1$ is brought into position against the armature and the machine revolved the proper number of turns, which will wind the wire into the first pair of slots. The upper lead is then caught under the snubbing hook 45 by simply backing up the machine, and advancing again to the position shown in Figure 1, when the lead setter and skinner 47 are brought into play and the lead set as previously described. The winding head 16 and its appurtenances is then disengaged and reengaged during which process the armature will be automatically indexed by the indexing dog 30. The operations are repeated until the coils which are all in the bottom of the slots have been wound in.

At this point the turret 16 should be revolved to the next position $T^2$, etc., which is adapted to winding the coils one side bottom, and the other side top of the slot, the operations are then repeated precisely as before until all the slots have part of a coil therein. Then the turret should again be revolved to position $T^3$ which is proportioned to put both sides of the coils in the top of the slots, and the operation repeated until the completion of the armature except that it is possibly better to throw back the upper leads of the first few coils winding the top coils over the first coils and replacing these leads over the last coils one at a time an operation that is facilitated by the fact that they are now free from the snubbing hook 45.

As previously intimated the forms of this invention shown nor the uses indicated are by no means the only ones which it may take or to which it may be put but they are deemed sufficient for the disclosure thereof.

Having now described my invention, I wish to claim:—

1. In an armature winding machine, the combination of means for winding an armature with means for protecting the insulation at the corner of the slots from the pull of the winding wire.

2. In an armature winding machine, the combination of means for guiding the wire into the slots of an armature with means for protecting the insulation at the corners of the slots from the pull of the winding wire.

3. In an armature winding machine, the combination of means for offsetting the winding wire, with means for protecting the insulation at the corners of the slots from the pull of the said wire.

4. In an armature winding machine, the combination of means for offsetting the winding wire with means for protecting the insulation at the corners of the slots from the pull of the said wire consisting of fingers juxtaposed to the ends of the said slots.

5. In a winding machine, the combination of means for winding wire, into spaces provided for said wire with means for holding the winding wire out of final position while other functions occur.

6. In a winding machine, the combination of means for winding wire, into spaces provided for said wire with nonarticulate means for holding the wire out of final position while other functions occur.

7. In an armature winding machine, the combination of means for winding an armature, with nonarticulate means for holding the winding wire at the entering end of the slot while other functions occur.

8. In an armature winding machine, the combination of means for winding an armature with means for holding the winding wire at the entering end of the slot while other functions occur consisting of a surface attached to a portion of said winding device set at such an angle as to oppose the motion of the winding wire into said slots.

9. In an armature winding machine, the combination of means for guiding the wire into the slots of armatures with a holding surface so placed as to oppose the motion of the wire into the slots.

10. In an armature winding machine, the combination with means for guiding the wire into the slots, and a holding surface so placed as to oppose the motion of the wire into the slots with a driving surface placed to overcome the resistance of the said holding surface as the said machine advances.

11. In a winding machine, the combination with a holding surface adapted to hold the winding wire while other functions occur, of a driving surface placed at such an angle that as the winding device advances the resistance of the said holding surface will be overcome by the said driving surface and the wire forced into position.

12. In a winding machine, the combination of a holding surface adapted to hold the winding wire out of the slots while other functions occur with means for offsetting the said wire.

13. In a winding machine, the combination of a holding surface, a driving surface, so placed that as the device advances the resistance of the holding surface will be overcome and means for offsetting the said wire.

14. In an armature winding machine, the combination of a holding surface adapted to hold the wire while other functions occur with means for protecting the insulation at the corners of the slots from the pull of the winding wire.

15. In an armature winding machine, the combination of means for holding the winding wire out of the slot while other function occur, means for protecting the insulation at the corners of the slots and means for offsetting the winding wire.

16. In an armature winding machine, the combination of means for holding the winding wire out of the slot while other functions occur, a driving surface adapted to overcome the holding means as the machine advances and means for protecting the insulation at the corners of the slots.

17. In an armature winding machine, the combination of means for holding the winding wire out of the slots while other functions occur, a driving surface for overcoming the holding means as the machine advances, means for offsetting the winding wire and means for protecting the insulation at the corners of the slots.

18. In a winding machine, the combination of means for holding the wire out of position while other functions occur, with a forming foot for forming the top of the coils.

19. In a winding machine, the combination of means for holding the wire out of position while other functions occur, means for offsetting the said wire and a forming foot for forming the top of the coil being wound.

20. In an armature winding machine, the combination of means for holding wire out of position while other functions occur, means for offsetting said wire, a forming foot and means for protecting the insulation at the corners of the armature slots.

21. In an armature winding machine, the combination of wire handling elements with articulate mountings for said elements.

22. In an armature winding machine, the combination of a wire handling element with a hinge for mounting said element.

23. In an armature winding machine, the combination of wire handling elements upon a hinge mounting with a spring for positioning said elements.

24. In an armature winding machine, the combination with articulated wire handling elements of an armature indexing dog acting against the teeth of the armature.

25. In an armature winding machine, the combination of an indexing dog acting against the teeth of the armatures, with means for preventing the backing up of said armature during the recession of said dog.

26. In an armature winding machine, the combination of means for indexing an armature consisting of a dog acting against the teeth thereof, means for supporting and removing said dog from said armatures so proportioned that as the dog recedes the difference between the sine of the angle made by the dog open and closed will equal the number of teeth to be indexed.

27. In a multipolar armature winding machine, the combination of means for placing the wire in the slots with fractional coil end forming fingers having substantially the shape of the interior of the overhanging portion of an armature coil.

28. In a multipolar armature winding machine, the combination of fractional coil end forming fingers shaped to fit the overhanging portion of an armature coil with a land adapted to retain coil turns without additional supports.

29. In a multipolar armature winding machine, the combination of fractional coil end forming fingers shaped to fit the overhanging portion of a coil end with a land having surfaces placed to prevent coil turns slipping off thereof.

30. In a multipolar armature winding machine, the combination of means for placing the wire in the slots of an armature with fractional coil end forming fingers having substantially the shape of the overhanging portion of the coil and lands having surfaces so placed as to retain turns of the coil without additional support.

31. In an armature winding machine, the combination of means for forming the end of an armature coil with an offsetter for laying end turns at appropriate places.

32. In an armature winding machine, the combination of means for offsetting the winding wire at corners of the coil with means for offsetting said wire at end thereof.

33. In a multipolar armature winding machine, the combination of fractional interior end coil forming fingers with means for offsetting the winding wire.

34. In an armature winding machine, the combination of means for winding the wire with pressure surfaces adapted to press wound coils back into place after having been released from coil forming members.

35. In an armature winding machine, the combination of means for offsetting the winding wire at appropriate places with means for pressing the wound coils back into place after having been released from the winding elements.

36. In an armature winding machine, the combination of means for holding the winding wire out of position while other functions occur, means for offsetting said wire and means for pressing wound coils back into place after release from the winding elements.

37. In an armature winding machine, the combination of sets of wire directing members with a turret support revoluble around an axis at an angle with its own.

38. In an armature winding machine, the combination of sets of wire directing members having offsetter with a turret for supporting said sets.

39. In an armature winding machine, the combination of sets of wire directing members, means for holding the winding wire out of position while other functions occur and a turret for supporting said sets.

40. In a lead handling device the combination with a lead setting edge of a means for locating said lead with reference thereto.

41. In a lead handling device the combination of a lead setting edge with means for locating said lead having sharpened edges for skinning the said lead.

42. In a lead handling device, the combination of a lead setting edge and means for locating said lead with file surfaces on parts contacting with the said lead for skinning the same.

43. In a lead handling device, the combination of a lead setting edge, means for locating said lead with reference thereto, and a handle.

44. In a lead handling device, the combination of a lead setting edge with means for securing alignment of said lead with said edge.

45. In a lead handling device, the combination of means for skinning said lead with means for locating said lead.

46. In a lead handling device, the combination of a lead setting edge with spring suspended means for locating said lead with reference thereto.

47. In a lead handling device, the combination of a lead setting edge, rigid means for locating the said lead, articulate means for locating said lead with reference thereto, means for skinning said lead and a handle.

48. In a winding device, the combination of means for handling a lead with articulated supporting means.

49. In a winding device, the combination of means for handling a lead, articulated support therefore and a cam and follower for spotting said lead handler.

50. In a winding device, the combination of means for handling a lead, articulate supports for the same, a spotting cam and follower with means for adjusting the point of spotting.

51. In a winding device, the combination of a lead handler, comprising a lead setting edge and means for locating leads thereto, with articulate supports for said handler and a cam and follower for spotting said handler.

52. In a winding device, the combination of a lead handler having means for setting the lead, means for locating the lead and means for skinning the lead with a cam and follower for spotting said handler.

53. In a winding device, the combination of a lead handler having means for setting the lead, means for locating the lead, means for skinning the lead, articulate supports for the lead handler and a cam and follower for spotting the handler.

54. In a winding machine, the combination of means for winding with a snubbing hook supported by the machine the hook facing towards the shaft of the armature to be wound.

55. In a winding machine, the combination of means for winding with a snubbing hook faced towards the shaft of the armature to be wound and a wire directing guide for guiding the lead wire into said hook.

56. In an armature winding machine, the combination with means for winding wire of a wire directing guide so placed as to guide the lead into a slot.

57. In an armature winding machine, the combination of means for winding an armature with a combined lead wire directing guide and holder.

58. In an armature winding machine, the combination with means for winding an armature of means for pressing the first coils into place as they come into position for winding the last coils thereover.

59. In an armature winding machine, the combination of means for winding an armature with a lead directing guide a presser surface thereon for pressing the first coils into position, means for applying a pressure thereto.

60. In an armature winding machine, the combination of a forming roller for forming the winding wire, with means for winding an armature having means for holding the winding wire out of position while other functions occur.

61. In a winding machine, the combination of means for winding wire with articulate means for holding the wire out of position till other functions occur.

62. In a winding machine, the combination of means for winding wire with means for holding the wire out of position while other functions occur consisting of a movable element placed in the path of the said wire in a manner to first hold it and then release it.

63. In a winding machine, the combination of means for winding wire, with means for holding the wire out of position while other functions occur, consisting of a rotatable element placed in the path of said wire arranged to first hold the wire and then release it.

64. In a winding machine, the combination of means for winding wire, with means for holding the wire out of position while other functions occur, consisting of a rotatable worm placed in the path of the winding wire, proportioned to discharge said wire as its rotation progresses.

65. In a winding machine, the combination of means for winding wire, a movable element for holding the wire out of position while other functions occur, and means for offsetting said wire associated therewith.

66. In a winding machine, means for holding the winding wire out of position while other functions occur, combining a rotatable worm placed in the path of the winding wire, an offsetting surface so placed that as the worm rotates it will discharge the said wire over said offsetting surface.

67. In a winding machine, means for holding the winding wire out of position while other functions occur, consisting of a worm placed in the path of the winding wire combined with means for actuating said worm.

68. In a winding machine, the combination of a worm for holding the winding wire out of position while other functions occur with means for actuating said worm consisting of a driving gear rigidly supported and a pinion attached to said worm.

69. In a winding machine, a system of actuating gearing for driving, a worm for holding the winding wire out of position while other functions occur, and an offsetting surface associated therewith.

70. In a winding machine, the combination of means for holding the winding wire out of position while other functions occur and an articulated offsetter.

71. In a winding machine, the combination of a worm for holding the winding wire out of position while other functions occur, an offsetter associated therewith, a system of gearing for actuating the same having a ratio of two to one the larger being fixed, the smaller actuating the movable elements.

72. In a lead handling device, the combination of means for setting the lead with means for skinning said lead.

73. In an armature winding machine, the combination of means for winding wire, with a transition surface joining up holding and driving surfaces.

74. In an armature winding machine, the combination of means for winding, wire, with a transition surface joining up holding, driving and offseting surfaces.

In testimony whereof I hereunto affix my signature this 19th day of March, 1924.

PENROSE E. CHAPMAN.